July 8, 1969

A. GRAHAM 3,453,992

ROTARY TYPE DEVICE

Filed July 8, 1968

INVENTOR.
ANTHONY GRAHAM

BY John Cyril Malloy

ATTORNEY

INVENTOR.
ANTHONY GRAHAM
BY John Cyril Malloy
ATTORNEY.

July 8, 1969 — A. GRAHAM — 3,453,992
ROTARY TYPE DEVICE
Filed July 8, 1968 — Sheet 3 of 4

INVENTOR.
ANTHONY GRAHAM
BY John Cyril Malloy
ATTORNEY.

INVENTOR.
ANTHONY GRAHAM
BY John Cyril Malloy
ATTORNEY

United States Patent Office 3,453,992
Patented July 8, 1969

3,453,992
ROTARY TYPE DEVICE
Anthony Graham, Go Home Bay, Via Penetang,
Ontario, Canada
Filed July 8, 1968, Ser. No. 743,234
Int. Cl. F02b 53/06, 55/14
U.S. Cl. 123—13                                      10 Claims

ABSTRACT OF THE DISCLOSURE

An improved rotary type device which includes: (a) a stator or housing defining two radially mating, preferably parallel cylindrical chambers, (b) a piston rotor journaled in one of the chambers and having a radially extending piston axially spanning a toroidal recess provided in the piston rotor surface, and (c) an abutment type sealing rotor within the other chamber which is provided with a gap to be synchronously rotated into the piston rotor chamber to mate with the piston and accommodate passage thereof; so that, in operation, as the leading edge of the gap on the sealing rotor cyclically passes over the leading surface of the piston, which is characterized by an improved and particular profile curved in a depthwise direction, a substantial gastight, labyrinth type seal of the toroidal recess is preserved both (1) between the leading edge of the gap and the leading piston surface and (2) between the confronting surface of the stator of housing; valve means are provided (1) to admit fluid mixture, and (2) to exhaust the same in timed relation with the rotation of the rotors.

In the past, there have been numerous types of rotary devices such as internal combustion engines. It has long been realized that a rotary type internal combustion engine is particularly desirable over other engine structures from many design standpoints. However, although the art relating to rotary devices is crowded, there have been serious problems encountered, particularly in effecting a seal for the operative chambers, i.e., the compression and combustion chambers. Among the problems encountered has been the attainment of an effective seal between the leading face of the piston on a piston rotor and the gap surface of a mating sealing rotor which sweeps it in operation. In this invention, improved sealing characteristics are achieved by reason of a novel piston configuration. The leading piston face is characterized by a profile particularly adapted to co-operate with a companion leading edge of the gap in the mating sealing rotor to effect a labyrinth type seal. Means are provided to synchronously rotate the rotors to initiate cyclical sweeping passage of the piston face and gap edge at a common speed.

It is, therefore, an object of this invention to provide an improved rotary device having a synchronously driven pair of rotors, (a) a sealing rotor with a gap and (b) a piston rotor having a piston, which piston is characterized by a leading face having a profile to sealingly engage a companion leading edge of the gap, the piston face profile being defined by a depthwise curve generated in a particular fashion described and claimed hereinafter.

A further object of this invention is to provide an improved internal combustion engine of the rotary type which does not include reciprocating major parts and is adapted by reason of improved sealing characteristics for efficient operation on petroleum distillates with the parts revolving evenly thereby reducing wear and tear in relation to other structures which are adapted to utilize the Otto cycle.

It is another object of this invention to provide an improved rotary device for use in compressing air which includes a pair of radially intermating rotors, (a) a sealing rotor with a gap, and (b) a piston rotor having a piston, wherein the leading edge of the gap and piston face are of a particular profile to effect a cyclical sweeping passage of leading gap edge over the piston face which in effect will cause a seal therebetween as the piston passes through the gap.

It is an object in general of this invention to provide an improved internal combustion engine of the rotary type which is of a relatively light weight construction, of increased efficiency relative to other internal combustion engines, is reliable, smooth and quiet in performance.

It is another object of this invention to provide an improved internal combustion engine of the rotary type which is simple in construction, inexpensive to manufacture and maintain, and which is well adapted for use in installations in which light weight power plants are desired.

In accordance with these and other objects which will become apparent hereinafter, the instant invention will now be described with reference to the accompanying drawings in which.

Figure 1:
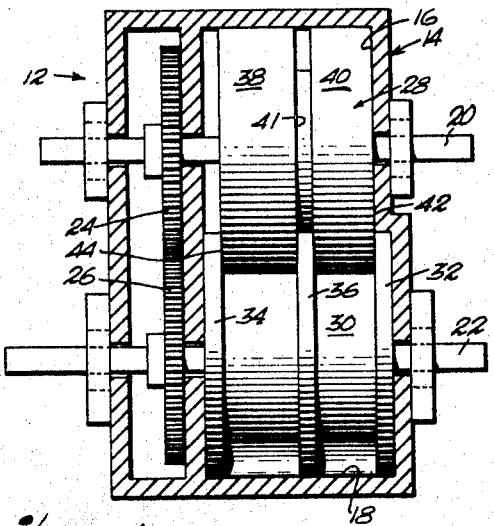
FIGURE 1 is a vertical view in cross section of the improved engine of this invention.
Figure 2:
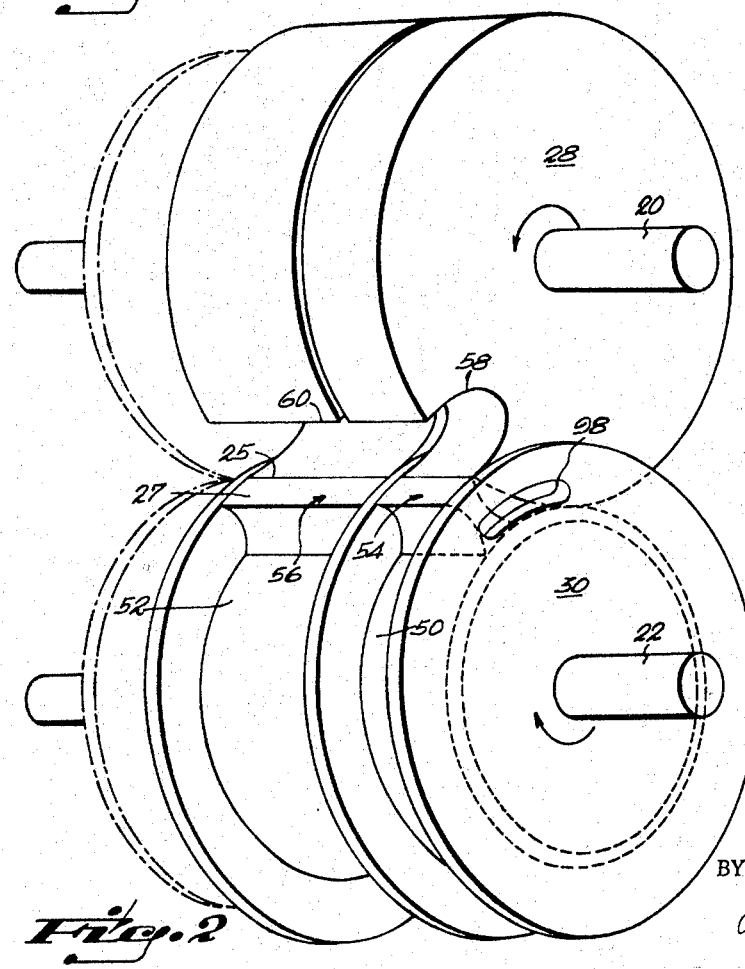
FIGURE 2 is a perspective view of the internal operating rotor of the invention and illustrating the piston structure.

Referring to the drawings wherein like referenced characters designate like or corresponding parts throughout the different views and particularly to the structure of the rotary internal combustion engine 12, it will be helpful to refer to FIGURES 1 and 2 initially. In FIGURE 1, a closed housing or stator 14 is provided which defines a pair of interior chambers, which mate radially, (a) rotor chamber 16 and a piston rotor chamber 18. The axes of the chambers are coplanar and are preferably right circular cylindrical cavities having parallel axes. An axial rotor shaft, such as 20 and 22, is arranged in each of the chambers, respectively, and intermeshing gear means 24 and 26 are provided to synchronize the rotation of the rotors. Now to be described. Within the chamber 16, an abutment type sealing rotor 28 is provided, which in a reciprocating internal combustion engine is analogous to a cylinder head.

The sealing rotor 28 is journaled on the shaft 20 and sized for close tolerance rotation to effect a labyrinth type seal with the stator walls in the chamber 16. Within the piston rotor chamber 18, a piston rotor 30 is journaled for rotation with the shaft 22. The piston rotor 30 is provided with radially enlarged end faces 32 and 34 respectively, and an intermediate coaxial spacer flange 36, preferably of the same radius as that of the end faces. The cross-sectional area of the end faces and intermediate flange is sized for close tolerance rotation within the piston rotor chamber 18. It will be seen on reference to FIGURE 1 that the sealing rotor is composed of an adjacent pair of spaced, coaxial drum-shaped portions on rotatable valve elements 38 and 40 with the intermediate annular space 41. This space 41 is of an axial dimension just sufficient to accommodate smooth rotation of the intermediate flange 36 of the piston rotor while the end faces 32 and 34 closely overlay the end faces 42 and 44 in embracing relation of the sealing or valve rotor.

As is apparent in FIGURE 2, a pair of toroidal recesses are defined in the piston rotor surface, one recess laying between each of the end faces 32 and 34 and the intermediate flange 36, the recesses being designated by the numerals 50 and 52 respectively. A radially extending piston is provided on the piston rotor such as that designated by the numerals 54 and 56. Each of the pistons axially span their associated recesses; and it will be seen that the sealing rotor is provided with companion gaps in each of the sealing rotor peripheries, the gaps being designated by the numbers 58 and 60 and being of sufficient radial depth such that the associated piston will smoothly pass therein. The rotors rotate at a common circumferential speed as synchronized by the aforesaid intermeshing gears; i.e., the gearing preferably results in the leading edge 25 of the sealing gap 60 having the same surface speed as the outer surface 27 of the piston. The profile of the piston face which provides the smooth sealing passage of the sweeping surface of the leading piston face and the gap edge will be described fully in those paragraphs which follow the operation now to be described.

The induction and compression stroke is illustrated in FIGURES 3, 4, 5 and 6; the power and exhaust stroke is illustrated in FIGURES 7, 8, 9 and 10. It will be apparent that in the preferred embodiment the induction and compression strokes occur simultaneously with the power and exhaust strokes as one of the piston lobes 56 rotates into and out of the associated gap 60 and the other piston lobe 54 rotates into and out of the gap 58.

Figure 3:
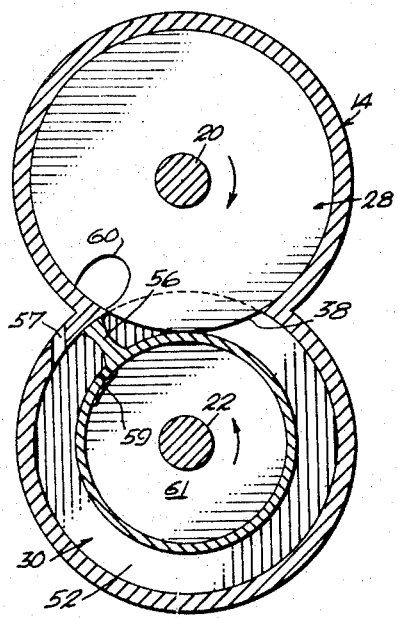
FIGURES 3, 4, 5 and 6 are schematic vertical section views which, in seriatim, illustrate the induction and compression stroke.
Figure 4:
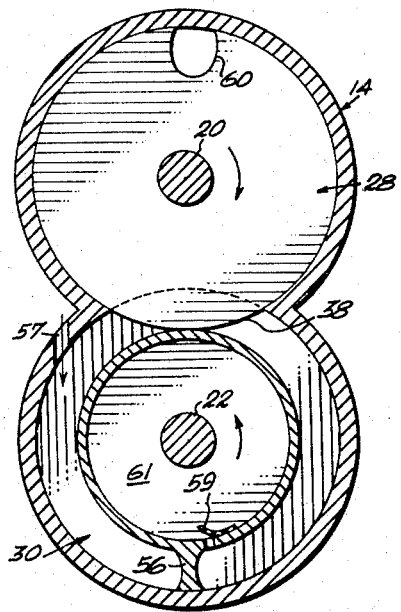
Figure 5:
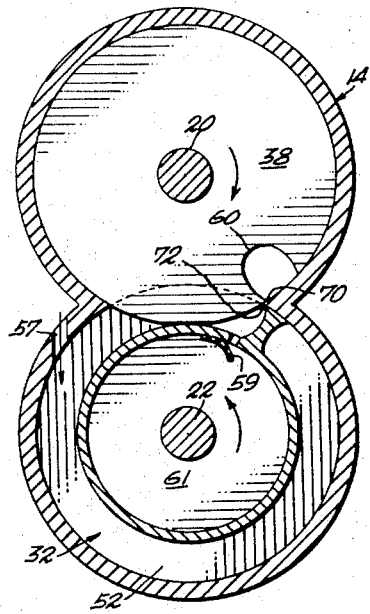
Figure 6:
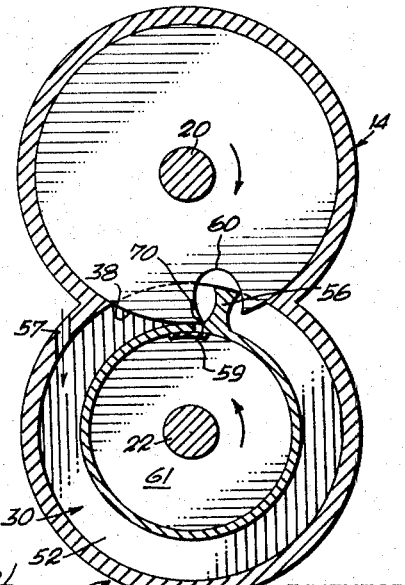

Turning now to the induction and compression stroke, and with reference to FIGURE 3, it is seen that the gap 60 has just been rotated in the direction of rotation indicated by the arrow out of mating relation with the piston lobe 56 as it advances toward the inlet port 57. At this stage, a one-way valve 59 in the floor of the toroidal recess 50 which leads to the hollow interior of the piston rotor, which defines a compression chamber 61, is closed under the influence of the relatively high pressure in the compression chamber. As the piston lobe 56 continues to advance, see FIGURE 4, the air which is induced in the previous stroke is compressed as the piston advances and is trapped for compression after the piston means has passed the inlet port 57 thus closing the toroidal recess 52 which is, as is apparent from the drawings, blocked by the sealing rotor 38 and the inside faces of the stator. As the rotor turns, the pressure in the recess increases until the one-way valve 59 opens permitting the gas which is being compressed to enter into the rotor hollow or compression chamber 61 for storage. As this is occurring, the negative pressure behind the piston lobe 56 is such that a new charge of air is indicated or aspirated through the inlet port 57. It will be apparent that, after the first few initial revolutions on starting of the engine, the one-way valve 59 will open on each successive revolution when the piston is at about the same angular position with respect to the center line of its axis of rotation. As seen in FIGURE 5, the piston has reached the terminal end of the compression part of the stroke and the edge 70 of the gap is about to mate with the outer leading edge 72 of the piston face 27, which because of the piston profile, the companion edge 70 and synchonous motions of the rotor, will sweepingly travel generally depthwise over it in sealing relation to the point of maximum penetration which is seen in FIGURE 6. In the portion shown in FIGURE 6, the valve 59 will close in response to the passage of the sweep edge 70 and elevated pressure in the chamber 61.

Figure 11:
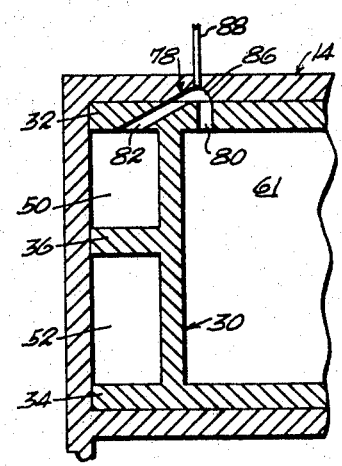
FIGURE 11 is a view in cross section taken along the plane indicated by the line 11—11 of FIGURE 8 and looking in the direction of the arrows to illustrate the input of the combustible mixture into the firing chamber.
Figure 7:
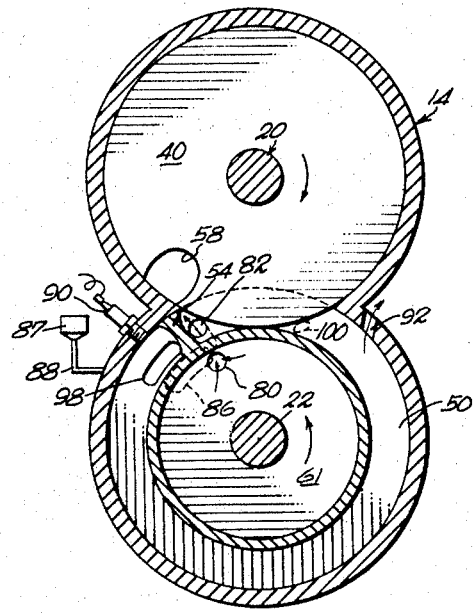
FIGURES 7, 8, 9 and 10 are a series of schematic views to illustrate the successive stages of operation of the power and exhaust strokes of the invention.
Figure 8:
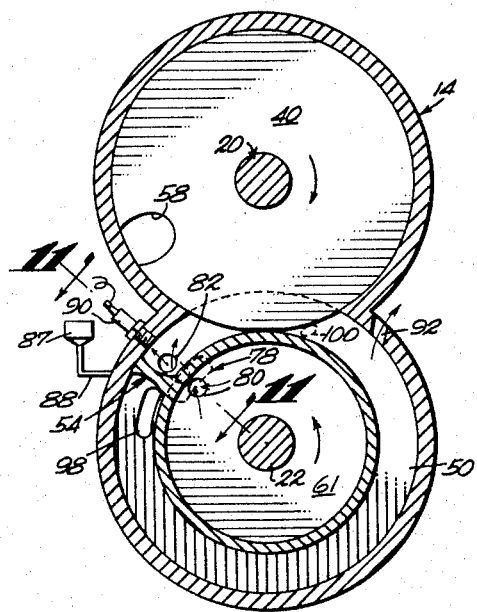
Figure 9:
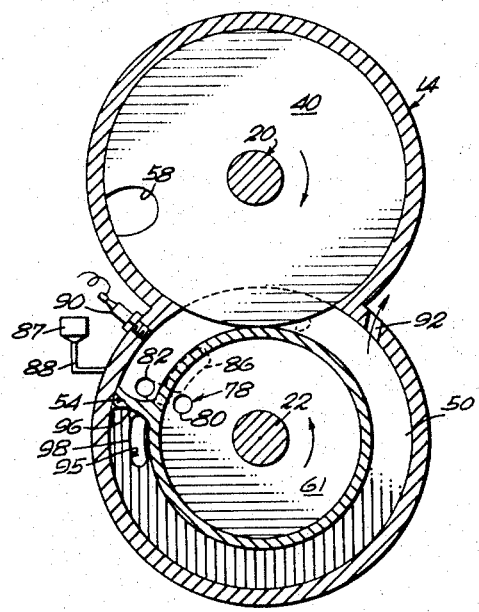
Figure 10:
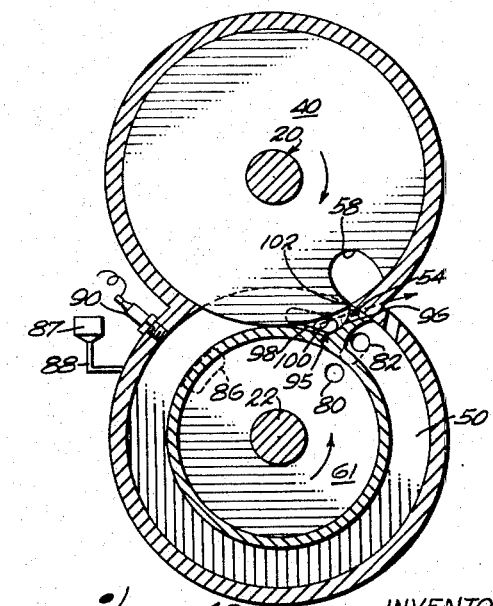

Turning now to the power and exhaust strokes and with reference, first, to FIGURE 7, it is seen that the portion 40 of the sealing rotor has just rotated into closing relation of the toroidal recess 50 as the piston lobe 54 or element rotates clear of the gap 58. As can be seen from FIGURE 11 taken on the plane indicated in FIGURE 8, at this stage, a charge of compressed gas from the storage chamber 61 is permitted to flow into the confined space in the recess 50 behind the trailing edge of the piston lobe 54 through a network of momentarily communicating passageways on conduit means. The compressed fluid passes through the conduit means generally designated 78 which includes a branch 80 in the piston rotor from the storage chamber, and a branch 82 also in the piston rotor just behind the piston lobe which cooperates with an arcuate intermediate limb 86, in the jacket wall as illustrated in FIGURE 11 by suitable means, not shown, fuel is injected through the line 88 into the arcuate portion 86 to mix with the compressed gas into a highly combustible mixture for ignition by the spark plug 90 which is timed to ignite the fuel mixture at about the position shown in FIGURE 8. It will be apparent that the arcuate portion 86 is of sufficient arcuate length so that a sufficient quantity of compressed fluid will pass through the lines 80 and 82 as the piston rotates. The valve means or conduit means 78 just described is effective to introduce a highly combustible mixture as indicated in the drawings while at the same time the separate volume of residual gases ahead of the piston from the previous power stroke are in the process of being expelled through the main exhaust port 92. As seen in FIGURE 8 in which the valve means or slider valve 78 is in the fully open position, fuel is injected into the compressed gas from the storage chamber as it passes from the combustion chamber into the cylinder in a turbulent stream of air, the pressure of which is rapidly falling to cause the fuel from the nozzle means 87 included in the line 88 to mix and blend uniformly to achieve the combustible mixture. As seen in FIGURE 9, on further rotation the valve means 78 closes as the piston rotates through several more degrees of rotation whereupon the fuel mixture is ignited by a timed spark from a source such as that shown, a conventional spark plug 90. After the slider valve means 78 has closed, the burning gases are confined behind the piston and, on expansion of the gases, the resultant forces the same in the direction shown, while at the same time, the exhaust gases from the previous power stroke are exhausted through the main exhaust port 92. Referring to FIGURE 10, it will be seen that, when the piston lobe is in this position, substantially all of the exhaust gases have been expelled through the main exhaust port 92. In the preferred embodiment a second valve means 95 is provided at the base of the leading face 96 of the piston lobe 54 which includes an arcuate opening 98 and a secondary exhaust port 100. It is thus seen that this second valve will open and allow the small volume of the gases remaining ahead of the piston when the piston enters the mouth of the gap to be expelled as the edge of the gap sweeps over the piston face. The peripheral leading edge 102 of the gap will travel depthwise into the toroidal recess tracing a path which is substantially coincident but of a slightly reduced radius of curvature along the curved leading face of the piston lobe in close adjacent labyrinth type sealing relation. On completion of the piston rotation through the gap, a new power stroke begins.

The profile of the leading face of the piston means will now be described. First, it will be helpful to refer to FIGURE 13 and to bear in mind that it is a planar representation of the piston rotor 16′ and the sealing rotor 18′ which are at all times arranged to move in opposite directions of rotation as indicated by the arrows and to be synchronously driven so as to have a common circumferential speed. In other words, a point 72 on the outer surface of the piston rotor 16' is moving at the same speed as the leading edge 70 of the sealing rotor gap. In referring to this figure it will also be helpful to bear in mind that this invention concerns the leading edge of the gap 70 which traces or "marks out" the profile of the piston face 74 and not the path of the piston into the gap of the sealing rotor 18'.

Figure 13:
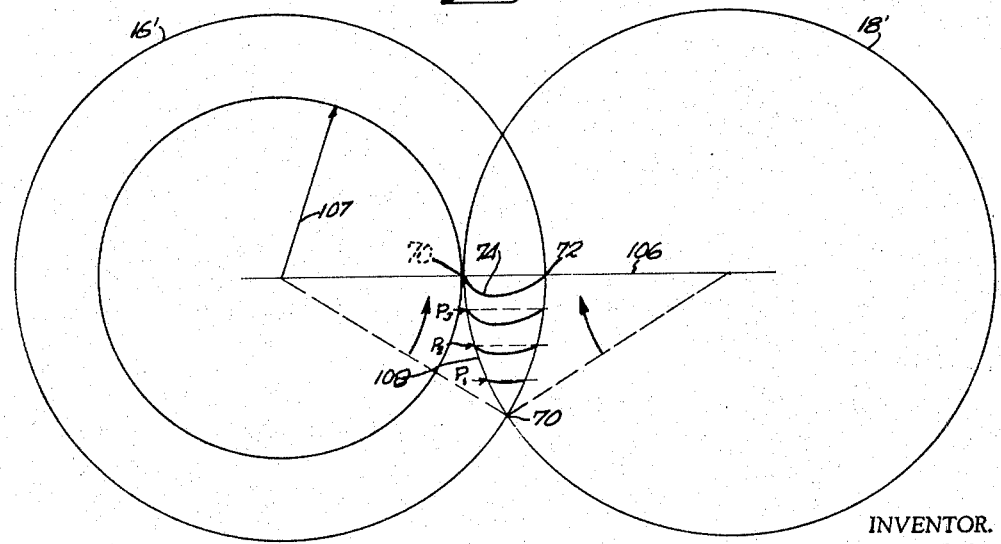
FIGURE 13 is a planar view through the rotors which is parallel to the plane through the center lines of the rotors.

With these preliminary considerations to orientate the following, a more ready understanding of the particular profile curve of the advancing face 74 will be facilitated by now considering the planar view of FIGURE 13 to be of any one of the planes through the rotors which is parallel to the plane through the center lines of the rotors. It will be appreciated that, as the piston rotor operates, the circumference of rotation of the leading outermost edge 72 of the piston defines a circle 16' in that selected plane. Similarly, as the sealing rotor operates, the leading edge of the gap 70 will define a second circle 18'. By reason of the construction of the device, these circles marginally overlap because the axes of rotation of the rotors so locate the circles. More precisely, the circles are adjacent to one another with their centers spaced a distance apart which is less than the sum of their radii and the least distance between their centers being such that the intersections of the circumferences define the sagittal line 106 joining the circle centers. Considering only one of the circles, for instance 18', as revolving, the point 70, representing the leading edge of the gap, will trace a circular path or arc 108 to the sagittus between the intersections of the circles biting into the area circumscribed by the circle 16', which we consider as stationary. However, if both circles 16' and 18' are rotating at a common circumferential speed and in opposite directions of rotation, as indicated by the arrows, the point 70 on the circumference of 18' will approach the sagittal line 106 along a much different path as it bites into the area of the simultaneously rotating circle 16'. This path is characterized by a curve or profile of a rather peculiar variable slope, see profile line 74. The profile 74 taken by the leading edge 70 of the gap in this plane as it moves to the sagittal line, i.e., to the position of the dotted numeral 70, is the path required in that plane for the leading edge of the gap to just bite into the area of the simultaneously rotating circle 16' to the depth of the proximal end of the piston, represented by the circle of the radius 107. It represents the optimum profile of the leading piston face 74 because it is the path which provides minimum clearance and, consequently, maximum sealing as the leading edge of the gap sweepingly travels over the surface of the profile or piston face. The points $P_1$, $P_2$, $P_3$, to the sagittal line are defined to aid in analysis of FIGURE 13. When all of the parallel planes are considered, it is seen that a piston face of the profile generated permits sweeping along the depthwise moving line of contact of the leading edge of the gap on each pass.

It will be apparent on careful consideration of the gap that, except for the leading gap edge being companionately configured to sweep the piston face, its dimensions and configuration are not critical, so long as there is sufficient space within the gap to permit smooth passage of the piston through the gap on continued rotation and the trailing edge of the gap 108' passes reasonably close to the trailing edge 110 of the piston. While the preferred construction disclosed illustrates the walls of the rotor at right angles to each other to produce a square or rectangle-sectioned toroid cylinder, it is within the range of practical operation to provide other configurations such as a design wherein the floor of a cylinder is of semicircular section; however, the simple square version is preferred. Also, referring to the hollow or chamber within the piston rotor, it is the preferred construction to provide such a chamber as a reservoir and link between the compression cylinder and the working cylinder; while in some installations it is recognized that it may be preferred to utilize additional or alternative storage means.

While the preferred embodiment is typified by the illustration of FIGURE 2 in which a piston is provided in each of the adjacent working chambers, it is recognized that more than one piston per working chamber may be provided with the synchronization means for driving the rotors being modified as by changing the gear ratios. The description of the profile of this invention is, accordingly, not limited to the common circumferential speed of the outer piston surface and the sealing rotor and contemplates those other profiles generated by differences in rotation at even multiples as, for instance, two rotations of the sealing rotor per rotation of the piston rotor.

Figure 14:
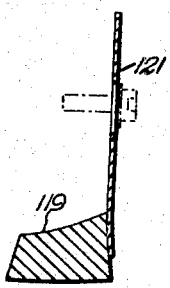
FIGURE 14 illustrates the replaceable element and its attachment to the biasing means.
Figure 12:
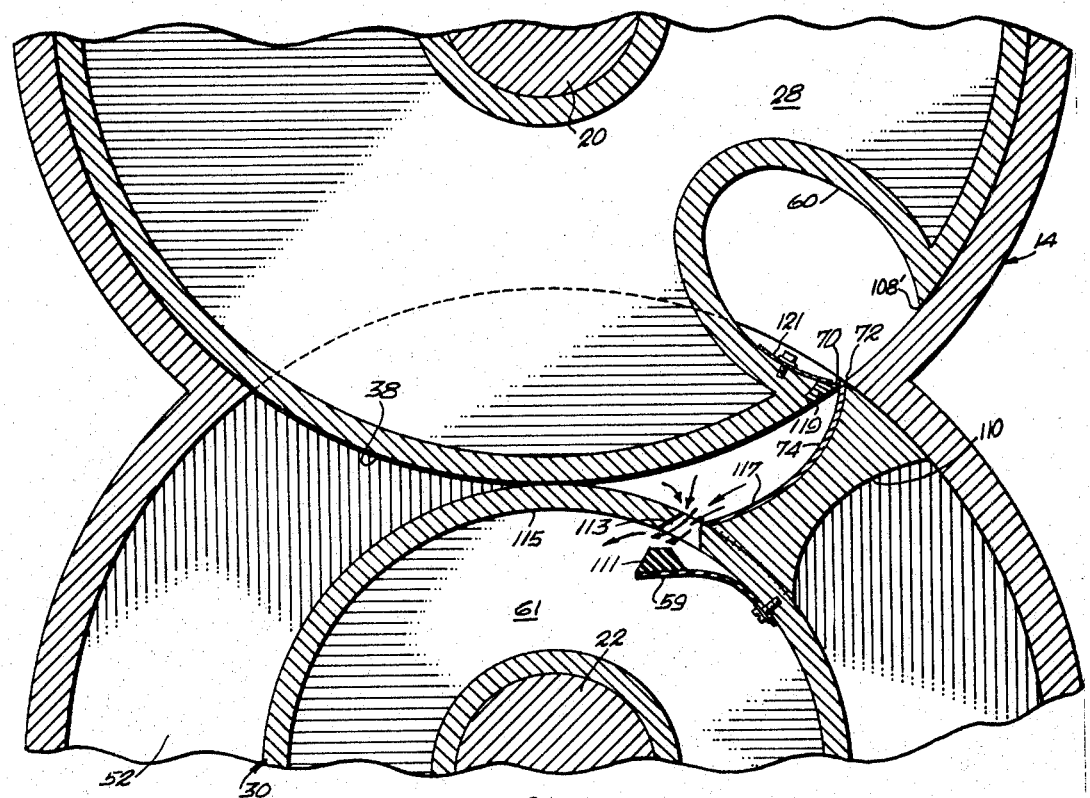
FIGURE 12 is an enlarged elevation view illustrating the intermating relation of the piston and the edge of the gap of the sealing rotor.

Referring to FIGURE 12, it is seen that preferably the flap type valve 59 includes a mating plug end 111 sized to dwell in nesting relation in the through bore 113 in the floor 115 of the toroidal recess. Also, a facing or liner 117 of suitable material is secured as by an adhesive or other suitable means well known in the art to the leading face of the piston adapting the same to be replaced on wear. The leading edge of the gap is also composed of a replaceable element 119 seen in FIGURE 14 and FIGURE 12 which is carried by a biasing means 121 such as the spring secured by suitable means to the wall of the gap adjacent the point of entry of the piston. Suitable bearings and gears well known in the art are employed together with conventional lubrication and cooling means well known in the art. The carburization is achieved by standard fuel injection means as is ignition and valving for the induction and exhausting of the operative fluids.

What is claimed is:

1. In a device including a housing, the improvement comprising:
    (A) A piston rotor including a radially extending piston having a leading face;
    (B) a sealing rotor having a gap in the circumferential surface with a leading edge to cyclically sweep over said piston face;
    (C) said rotors having coplanar axes and arranged for simultaneous, cyclical rotation in close labyrinth type sealing relation with the housing and for passage of the piston through the gap companionately;
    (D) said leading piston face having a lateral profile defined by a face curve generated thus:
        (a) where a first circle is defined by a first point on said edge rotating about the center of rotation of said rotor;
        (b) where a second circle is defined by a second point on the outer surface of the piston rotating about the center of rotation of the piston rotor;
        (c) where the line joining centers of rotation of said rotors is of such a length that said circles overlap and the circumferences cut said line;
        (d) where the circles rotate at a constant ratio of rotation in opposite directions;
        (e) said face curve is the path taken by said first point from its entrance into said second circle to its intersection with said line;
    (E) means interconnecting said rotors for rotation of the same in opposite directions of rotation at a constant ratio of rotation to cyclically sweep said edge over said face in sealing relation; and
    (F) valve means in the piston rotor adjacent the proximal end of said piston.

2. The device as set forth in claim 1 wherein said leading face comprises a replaceable facing.

3. The device as set forth in claim 2 wherein said facing is selected from the class which includes carbon and boron fluoride.

4. The device as set forth in claim 1 wherein said leading edge comprises a replaceable planar material.

5. The device as set forth in claim 4 wherein said leading face comprises a replaceable facing.

6. The device as set forth in claim 1 wherein said piston rotor is hollow and defines a storage chamber and one-way valve means in said piston rotor adjacent the proximal end of said piston adjacent said leading face for one way passage of compressed fluid into said chamber.

7. The device as set forth in claim 1 wherein said sealing rotor is provided with an intermediate annular peripheral recess and said piston rotor includes end faces and an intermediate flange of a radius greater than a circle defined by the radius of the proximal end of the piston for embracingly engaging the ends of the piston rotor with said flange sized for close tolerance receipt in said annular recess, said sealing rotor being sized for smooth and snug rotation between said end faces.

8. The device as set forth in claim 6 wherein said sealing rotor is provided with an intermediate annular peripheral recess and said piston rotor includes end faces and an intermediate flange of a radius greater than a circle defined by the radius of the proximal end of the piston for embracingly engaging the ends of the piston rotor with said flange sized for close tolerance receipt in said annular recess, said sealing rotor being sized for smooth and snug rotation between said end faces.

9. The device as set forth in claim 1 wherein said rotors are parallel.

10. The device as set forth in claim 6 wherein a discharge port and a charging port are provided in one end of said piston rotor, said discharge port communicating between the storage chamber and the exterior surface of the piston rotor and said charging port communicating between the exterior surface of the end of the piston and the recess in the piston surface adjacent the base of the leading edge of the piston and communicating passageway means are provided in the surface confronting said end of the piston rotor so that on rotation of the piston rotor a path of fluid communication will cyclically open and close when the terminal ends of the communicating passageway are in opposition to the discharge and charging port to temporarily complete the fluid path whereby a charge of fluid from the compression chamber will flow into the space ahead of the leading face of the piston.

References Cited

UNITED STATES PATENTS

| | | | |
|---|---|---|---|
| 1,933,415 | 2/1931 | Cimins | 123—13 |
| 1,949,723 | 3/1934 | Kotelevtseff | 122—13 |
| 2,423,763 | 7/1947 | Faresco | 123—13 |
| 2,786,332 | 3/1957 | Taverniers | 123—13 |
| 2,920,610 | 1/1960 | Breele | 123—13 |
| 3,366,096 | 1/1968 | Mathews. | |

C. J. HUSAR, *Primary Examiner.*

U.S. Cl. X.R.

123—8